(12) United States Patent
Tagami

(10) Patent No.: US 8,365,210 B2
(45) Date of Patent: Jan. 29, 2013

(54) DISK STABILIZER TO PREVENT DISK STICKING AND METHOD THERETO

(75) Inventor: Kenji Tagami, Tokyo (JP)

(73) Assignee: NEC Corporation, Tokyo (JP)

( * ) Notice: Subject to any disclaimer, the term of this patent is extended or adjusted under 35 U.S.C. 154(b) by 82 days.

(21) Appl. No.: 13/119,253

(22) PCT Filed: Nov. 6, 2009

(86) PCT No.: PCT/JP2009/068977
§ 371 (c)(1),
(2), (4) Date: Mar. 16, 2011

(87) PCT Pub. No.: WO2010/055810
PCT Pub. Date: May 20, 2010

(65) Prior Publication Data
US 2011/0214139 A1 Sep. 1, 2011

(30) Foreign Application Priority Data
Nov. 12, 2008 (JP) .................................. 2008-290223

(51) Int. Cl.
*G11B 33/08* (2006.01)
(52) U.S. Cl. ..................................................... 720/651
(58) Field of Classification Search .................. 720/703, 720/719, 651
See application file for complete search history.

(56) References Cited

U.S. PATENT DOCUMENTS

| 6,817,023 | B2 * | 11/2004 | Minase ......................... 720/648 |
| 7,380,253 | B2 * | 5/2008 | Yamauchi et al. ............ 720/651 |
| 8,069,453 | B2 * | 11/2011 | Miyazaki ..................... 720/612 |
| 8,220,010 | B2 * | 7/2012 | Yamauchi et al. ............ 720/651 |

FOREIGN PATENT DOCUMENTS

| JP | 10-308059 A | 11/1998 |
| JP | 2004243430 A | 9/2004 |
| JP | 2006164488 A | 6/2006 |
| JP | 2007287189 A | 11/2007 |
| JP | 2008010050 A | 1/2008 |
| JP | 2008287819 A | 11/2008 |
| JP | 2008287833 A | 11/2008 |

OTHER PUBLICATIONS

International Search Report for PCT/JP2009/068977 mailed Feb. 2, 2010.

* cited by examiner

*Primary Examiner* — Angel A. Castro

(57) ABSTRACT

A disk stabilizing plate is disposed oppositely below a thin disk for the purpose of allowing the thin disk to rotate stably, in a recording and reading device that uses a flexible thin disk for recording and reading. The disk stabilizing plate has a movable disk support member, relative to the prescribed rotation condition of the thin disk, that is caused to protrude upward from the surface of the disk stabilizing plate to touch and support the thin disk, or that is drawn downward from the surface of the disk stabilizing plate from the state touching and supporting the thin disk so that the state wherein the thin disk is touched and supported is terminated.

10 Claims, 9 Drawing Sheets

US 8,365,210 B2

DISK STABILIZER TO PREVENT DISK STICKING AND METHOD THERETO

REFERENCE TO RELATED APPLICATION

This application is the National Phase of PCT/JP2009/068977, filed Nov. 6, 2009, which is based upon and claims the benefit of the priority of Japanese patent application No. 2008-290223 filed on Nov. 12, 2008, the disclosure of which is incorporated herein in its entirety by reference thereto.

TECHNICAL FIELD

This invention relates to a disk stabilizer for a record/read (reproduction) device to record and read (reproduce) information, in which a flexible thin disk is mounted on a turntable and rotated. More particularly, the invention relates to a disk stabilizer to prevent disk sticking and a method to prevent disk sticking.

BACKGROUND

As the volume of information handled by a computer is increasing recently, the capacity of a memory device for storing such information is remarkably increasing. A hard disk, optical disk and magnetic tape are the main devices for such a memory device. A hard disk is used as a main memory due to its rapid recording and regenerating capability and random accessibility. An optical disk or magnetic tape is used as an archive or for back-up purposes.

A magnetic tape is superior to an optical disk from the viewpoints of its low price and recording capacity per unit volume. An optical disk is superior to a magnetic tape from the viewpoints of random accessibility and storage. Thus it is desired to increase the recording capacity of an optical disk for obtaining both merits of a magnetic tape and an optical disk.

A technique to increase a recording capacity per unit volume by thinning a thickness of an optical disk has been proposed for the purpose of increasing capacity of an optical disk that is superior from the viewpoints of random accessibility and storage. A technique has been also proposed to suppress plate-vibration of a thin disk and make the thin disk rotate stably by using a stabilizing plate, disclosed in Patent Documents 1 and 2, so as to utilize aerodynamic force generated by air flowing between the thin disk and the stabilizing plate. Patent Document 3 discloses a chucking device using centrifugal force to increase gripping power of a chuck claw.
[Patent Document 1]
Japanese Patent Kokai Publication No. JP-A-10-308059
[Patent Document 2]
Japanese Patent Kokai Publication No. JP-P2006-164488A
[Patent Document 3]
Japanese Patent Kokai Publication No. JP-P2004-243430A

SUMMARY

It should be noted that the contents disclosed in Patent Documents 1 to 3 are hereby incorporated herein by reference thereto in their entirety. The following analyses are given by the present invention.
A disk stabilizing plate for a thin disk disclosed in Patent Documents 1 and 2 is made such that a surface of the plate is flat and smooth by a grinding machining and the like so as to flow the air smoothly. Therefore, when a thin disk is not rotated, the thin disk may droop by the gravity and come into contact with the stabilizing plate, causing local adhesion of the disk and being damaged.

PURPOSE OF THE INVENTION

It is an object of the present invention to provide a mechanism and a method to prevent a contact and an adhesion of a thin disk with a disk stabilizing plate in a resting time or rotating time at a low speed when the possibility of contact between the thin disk and the stabilizing plate becomes highest.

According to the present invention, there is provided a disk stabilizing plate for making a thin disk rotate stably, provided underneath the thin disk and in a record/read device that handles a thin, especially flexible, record/read disk, that comprises a movable disk supporting member that, in connection with a predetermined rotating condition of the thin disk, supports the thin disk by protruding upwardly over a surface level of the disk stabilizing plate and contacting the thin disk, or terminates the supporting state for the thin disk by lowering below the surface level of the disk stabilizing plate.

According to the present invention, there is provided a method for preventing sticking of a thin disk to a disk stabilizing plate for making the thin disk rotate stably that is provided underneath the thin disk and in a record/read device that handles a thin, especially flexible, record/read disk, that comprises (a step of) protruding a movable disk supporting member upwardly over a surface level of the disk stabilizing plate to support a thin disk in connection with a predetermined rotating condition of the thin disk, or (a step of) lowering the movable disk supporting member below the surface level of the disk stabilizing plate in connection with the predetermined rotating condition of the thin disk.

According to the present invention, it becomes possible to prevent contacting a thin disk with a disk stabilizing plate and thus prevent local sticking of the thin disk to the disk stabilizing plate that causes a damage of the thin disk.

PREFERRED MODES

The disk supporting member preferably supports the thin disk by protruding upwardly over a surface level of the disk stabilizing plate and contacting the thin disk when a rotating speed of the thin disk is not larger than a predetermined value, and the disk supporting member is lowered below the surface level of the disk stabilizing plate when the rotating speed of the thin disk exceeds the predetermined value.

The disk stabilizing plate can be rotated along with the thin disk.

The disk supporting member can be made of an elastic member an end of which is provided with additional mass and the other end of which is fixed to the disk stabilizing plate. The end portion is protruding upwardly over the surface level of the disk stabilizing plate when no external force is applied. The disk stabilizing plate rotates along with the thin disk and when the rotating speed exceeds the predetermined value, the elastic member bends toward radially outer direction of the thin disk by the centrifugal force of the mass attached at the end of the disk supporting member and the disk supporting member is lowered below the surface level of the disk stabilizing plate.

The disk stabilizing plate can be disposed stationary and not rotated.

The disk supporting member can comprise a roller at a position contacting with the disk. And the disk stabilizing plate can comprise a disk supporting member driving portion that makes the disk supporting member, in connection with the predetermined rotating condition of the thin disk, protrude upwardly over the surface level of the disk stabilizing plate, or lower below the surface level of the disk stabilizing plate from the supporting state for the thin disk.

According to the method of the present invention, the disk supporting member is protruded upwardly over the surface level of the disk stabilizing plate when a rotating speed of the thin disk is not larger than a predetermined value, and the disk supporting member is lowered below the surface level of the disk stabilizing plate when the rotating speed of the thin disk exceeds the predetermined value.

The disk supporting member can be made of an elastic member an end of which is provided with additional mass and the other end of which is fixed to the disk stabilizing plate, and the disk supporting member is lowered by centrifugal force generated by rotation of the disk stabilizing plate that rotates with the thin disk.

The method may comprise (a step of) protruding or lowering the disk supporting member, having a roller at a position contacting with the disk, by a disk supporting member driving portion in accordance with a rotating speed of the thin disk.

EXEMPLARY EMBODIMENT

Exemplary Embodiments of the present invention will be explained in detail with reference to the drawings.

First Exemplary Embodiment

Figure 1:
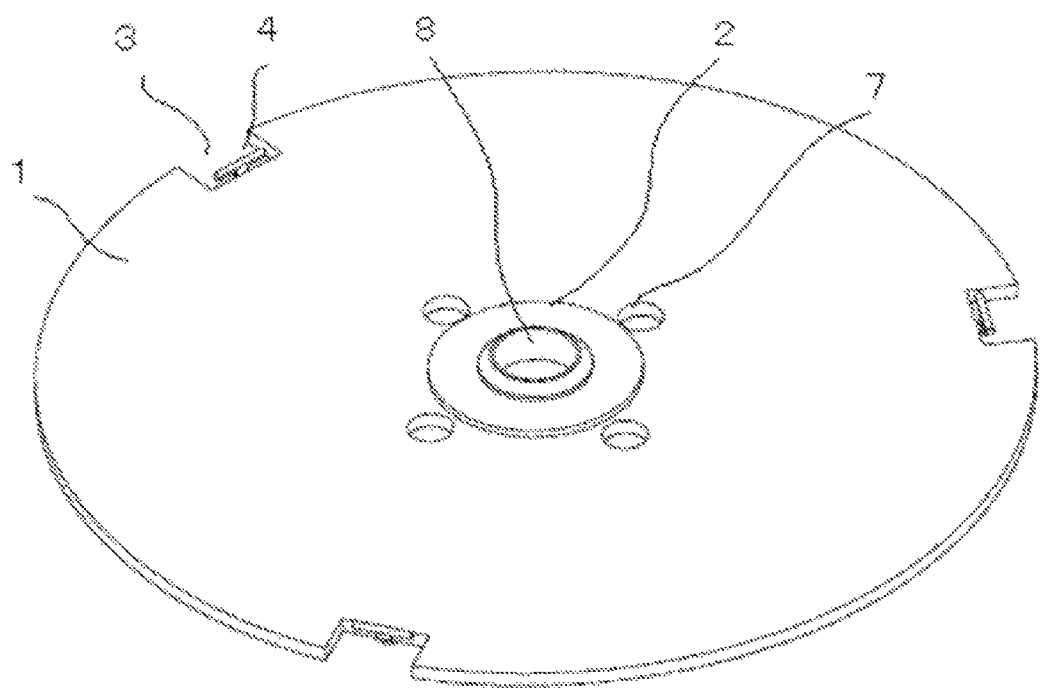
FIG. 1 is a whole perspective view of a disk stabilizing plate according to an Exemplary Embodiment 1 of the present invention.

FIG. 1 is a whole perspective view of a disk stabilizing plate according to a first Exemplary Embodiment of the present invention. This Exemplary Embodiment will be explained on the assumption that a wavelength of a laser beam for recording/reading is 450 nm and a numerical aperture (NA) of an objective lens to collect the laser beam is 0.85.

Referring to FIG. 1, a hub 2, on which a thin disk (not shown) will be inserted, is provided at the center of a disk stabilizing plate 1 having a shape of saucer. A hub hole 8, in which a spindle motor will be inserted, is formed at the center of the hub 2. A plurality of air holes 7 are provided in the vicinity of the hub 2 of the disk stabilizing plate 1. Four air holes can be seen in this Exemplary Embodiment. At a peripheral edge of the disk stabilizing plate 1, there is provided concave portions 3 at regular intervals. A disk supporting member 4 is fixed inside the concave portion 3. Preferably three or more concave portions 3, inside of which the disk supporting member 4 is fixed, are provided. That is because at least three supporting points are necessary to support a thin disk stably in planar state. In this Exemplary Embodiment, three concave portions are illustrated.

Figure 2A:
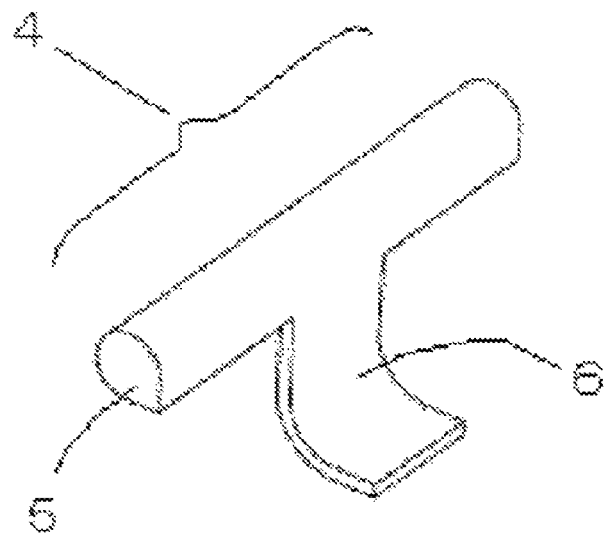
FIG. 2A is a whole perspective view of a disk supporting member according to an Exemplary Embodiment 1 of the present invention.

FIG. 2A is a whole perspective view of the disk supporting member 4. The supporting member 4 is roughly T-shaped, in which a supporting portion (mass portion) 5 is fixedly disposed at an upper part of a bent-plate-shaped elastic member 6, and has a structure in which a mass is additionally provided at one end of a cantilever beam. According to Exemplary Embodiment 1, the supporting portion 5 serves as both a supporting portion to contact-support a thin disk and a mass portion to generate the enough centrifugal force; however, the supporting portion may be structured with a different member(s).

Figure 2B:
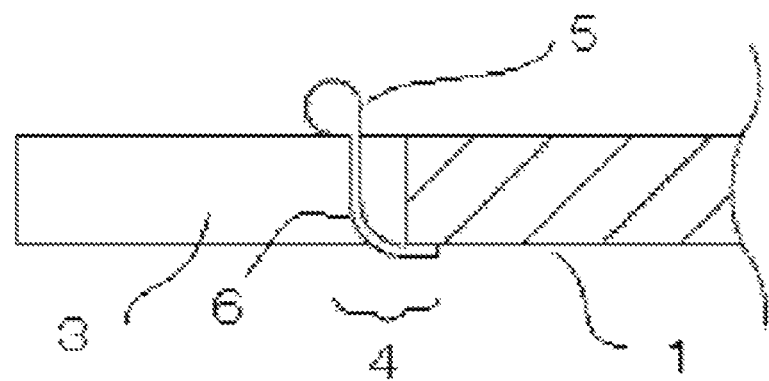
FIG. 2B is an enlarged partial section of a concave portion of a disk stabilizing plate according to an Exemplary Embodiment 1 of the present invention.

FIG. 2B is an enlarged partial section of the concave portion 3 in which the disk supporting member 4 is fixed. When the disk stabilizing plate 1 is in a standstill state, the supporting portion 5 provided at one end of the disk supporting member 4 protrudes toward a thin disk from a surface level of the disk stabilizing plate 1, as shown in FIG. 2B.

Figure 3:
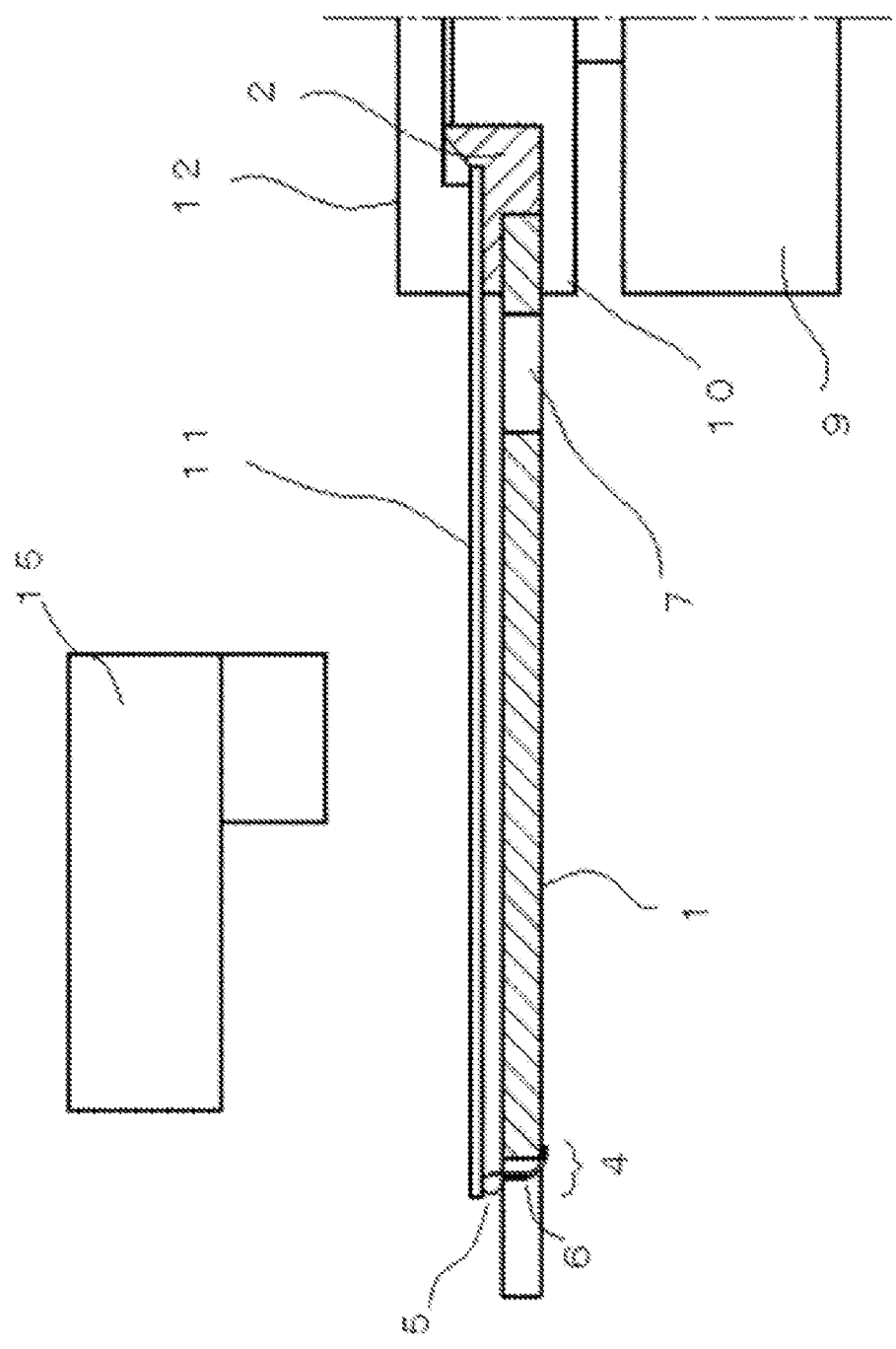
FIG. 3 is a sectional view of a stabilizing plate according to an Exemplary Embodiment 1 of the present invention in a stationary state.

FIG. 3 is a sectional view of half portion of a device, in which a thin disk 11 is put on a disk stabilizing plate 1 and the disk stabilizing plate 1 is placed on a spindle motor 9. The disk stabilizing plate 1 is mounted on a turntable 10 of the spindle motor 9 such that a shaft of the spindle motor 9 is engaged with the hub hole 8 of the hub 2. The thin disk 11 is mounted on the disk stabilizing plate 1 such that a center hole of the disk is engaged with the hub 2. Thus the disk stabilizing plate 1 rotates along with the thin disk 11. The air holes 7 penetrate the disk stabilizing plate 1.

The disk stabilizing plate 1 mounting the thin disk 11 thereon is fixed to the spindle motor 9 by a clamper 12. A peripheral area of the thin disk 11 is contact-supported by the supporting portion 5 of the disk supporting member 4 that protrudes over the surface level of the disk stabilizing plate 1. Thus the surface of the disk stabilizing plate 1 is not in contact with the thin disk. Further, an optical head 15 is arranged at an opposite side of the disk stabilizing plate 1 with respect to the thin disk 11.

The mass of the supporting portion 5 and degree of rigidity stiffness of the elastic (resilient) member 6 are set such that the elastic member 6 bends due to a centrifugal force exerted to the supporting portion 5 until the supporting portion 5 sinks below the surface level of the disk stabilizing plate 1 when the spindle motor 9 and the disk stabilizing plate 1 with the thin disk II rotate and the rotating speed reaches a predetermined value, such as 90% of the lowest rotating speed for recording/reading, for example. Such a situation can be calculated easily by a simulation using the finite element method.

The structure of Exemplary Embodiment 1 was explained in detail. An explanation of a structure and a driving mechanism of the optical head 15 in FIG. 3 and a fixation method of the disk stabilizing plate 1 onto the spindle motor 9 are not described because they are well-known by a person skilled in the art and they do not relate to the present invention.

An operation of Exemplary Embodiment 1 will be explained with reference to FIGS. 3 and 4. The same numerals in FIGS. 3 and 4 designate the same members. When the spindle motor 9 does not rotate (or rotates at a low speed), the thin disk 11, the disk stabilizing plate 1 and the disk supporting member 4 are in the state as shown in FIG. 3, in which the thin disk 11 is contact-supported at the peripheral area by the supporting portion 5 of the disk supporting member 4 and the thin disk 11 does not contact with the disk stabilizing plate 1. Thus the thin disk 11 does not locally adhere to the disk stabilizing plate 1.

Figure 4:
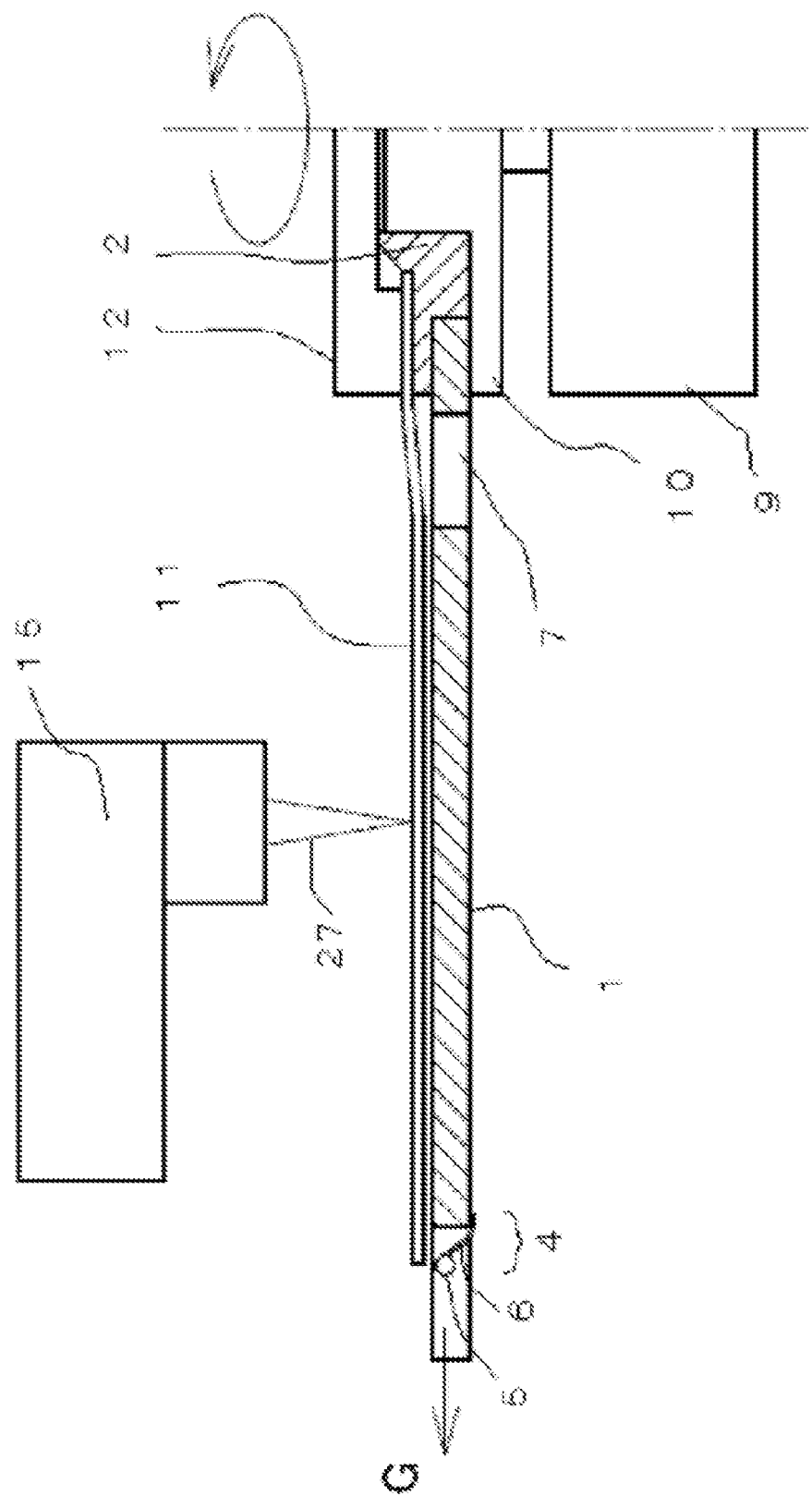
FIG. 4 is a sectional view of a stabilizing plate according to an Exemplary Embodiment 1 of the present invention in a rotating state.

FIG. 4 shows a state when they rotate at a predetermined rotating speed. Along with the rotation of the spindle motor 9, the disk stabilizing plate 1 secured on the spindle motor 9 and the thin disk 11 start rotating. Then a centrifugal force G is exerted to the supporting portion (Mass portion) 5 fixedly disposed at one end of the elastic member 6 in the leftward direction of an arrow as shown in the figure. As increasing the rotating speed, the centrifugal force G of the supporting portion 5 increases. The opposite end of the elastic member 6 to the supporting portion 5 is secured on the disk stabilizing plate 1. Therefore, as the rotating speed increases and the centrifugal force G of the supporting portion 5 increases, the elastic member 6 is bent and starts to sink below the surface level of the disk stabilizing plate 1.

When the rotating speed reaches a predetermined value such as 90% of the lowest rotating speed for recording/reading, for example, the elastic member 6 is bent by the centrifugal force G of the supporting portion 5, and the supporting portion 5 sinks below the surface level of the disk stabilizing plate 1. As a result of the sinking of the supporting portion 5 below the surface level of the disk stabilizing plate 1, the thin disk 11 loses the contact-supporting state at its peripheral area and is rendered in a free state that only the center portion is held by the clamper 12. As the disk stabilizing plate 1 rotates, the air enters from the air holes 7 of the disk stabilizing plate and flows in the space between the thin disk 11 and the disk stabilizing plate 1 to the periphery of the disk. By the aerodynamic force of the air flow, the disk 11 is attracted (absorbed) to the disk stabilizing plate 1 and can keep a small distance from the disk stabilizing plate and rotate stably with less disk contact.

In this state, an optical beam 27 is applied on the thin disk 11 from the optical head 15 and the recording/reading is performed. Because the supporting portion 5 is sunk below the surface level of the disk stabilizing plate 1 during the recording/reading, the air flow is not disturbed. When the recording/reading is completed, the spindle motor 9 begins to decrease its rotating speed. As the rotating speed decreases, the centrifugal force of the supporting portion 5 decreases, and when the rotating speed reaches the predetermined value such as 90% of the lowest speed for recording/reading, the supporting portion 5 begins to rise over the surface level of the disk stabilizing plate 1. When the spindle motor stops, the supporting portion returns to the state of FIG. 3, and the thin disk 11 is supported at the peripheral area by the supporting portion 5 and does not contact with the disk stabilizing plate 1. Thus the thin disk 11 does not locally adhere to the disk stabilizing plate 1.

It is assumed in this Exemplary Embodiment 1 that a wavelength of the laser beam used for recording/reading is 405 nm and a numerical aperture NA of the objective lens for collecting the laser beam is 0.85. However, the same structure can be applied even in a case where a wavelength of the laser beam is 650 nm or less and an NA of the objective lens is 0.6 to 0.7.

In such a case, the optical head 15 may be provided at the same side and under the disk stabilizing plate 1 although the optical head 15 is provided at the opposite side of the disk stabilizing plate 1 from the thin disk 11 in Exemplary Embodiment 1.

In such a case, a material of the disk stabilizing plate 1 can be an optical glass through which the laser beam can penetrate, and its thickness can be 0.5 mm, for example, that can be optically modified such that the thin disk 11 can be handled with a conventional optics of an optical head. The contact position of the thin disk 11 and the supporting portion 5 is preferably outer area of the most peripheral recording region of information so as to protect the information recording region of the thin disk 11. In addition, a radial position of the concave portion 3 of the disk stabilizing plate 1 to provide the disk supporting member 4 is located further than the radial position of the periphery of the information recording region of the thin disk 11 because the laser beam for recording/reading is applied on the thin disk 11 through the disk stabilizing plate 1.

Exemplary Embodiment 2

The first Exemplary Embodiment of the present invention has a structure such that the disk stabilizing plate rotates along with the spindle motor and the thin disk. However, a disk stabilizing plate system having the basic structure as a first Exemplary Embodiment can be structured in a case where a disk stabilizing plate is disposed stationary while only a thin disk rotates along with a spindle motor. The rotating load of the spindle motor can be decreased by immobilizing the disk stabilizing plate and it contributes reduction of electric power consumption.

A second Exemplary Embodiment will be explained with reference to the drawings. The drawings hereinafter will be explained on the assumption that a wavelength of the laser beam is 405 nm and a numerical aperture (NA) of the objective lens to collect the laser beam is 0.85.

Figure 5:
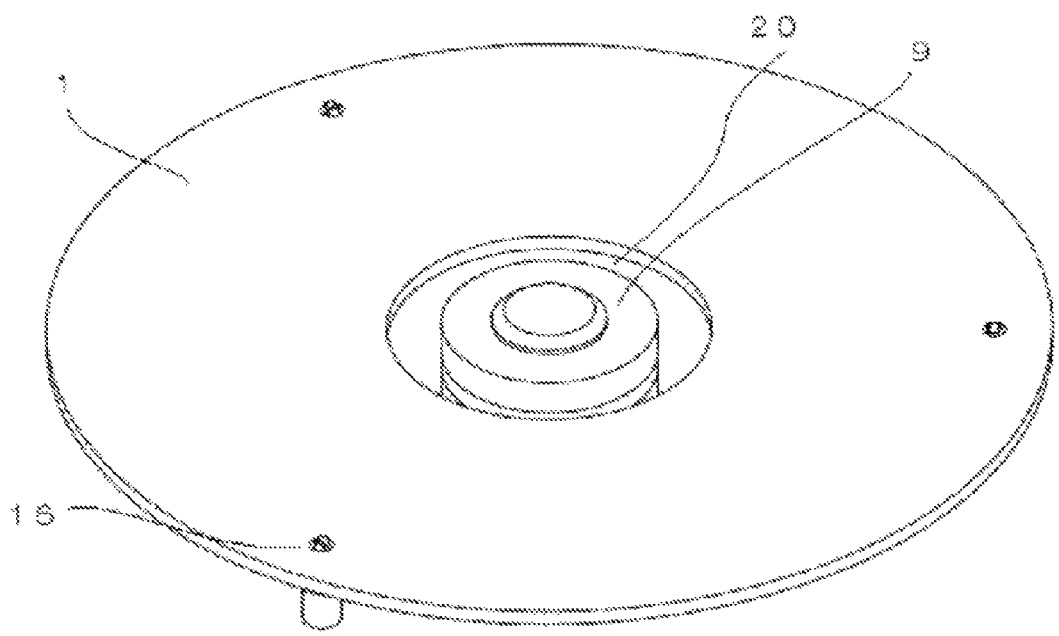
FIG. 5 is a surface perspective view of a disk stabilizing plate according to an Exemplary Embodiment 2 of the present invention.
Figure 6:
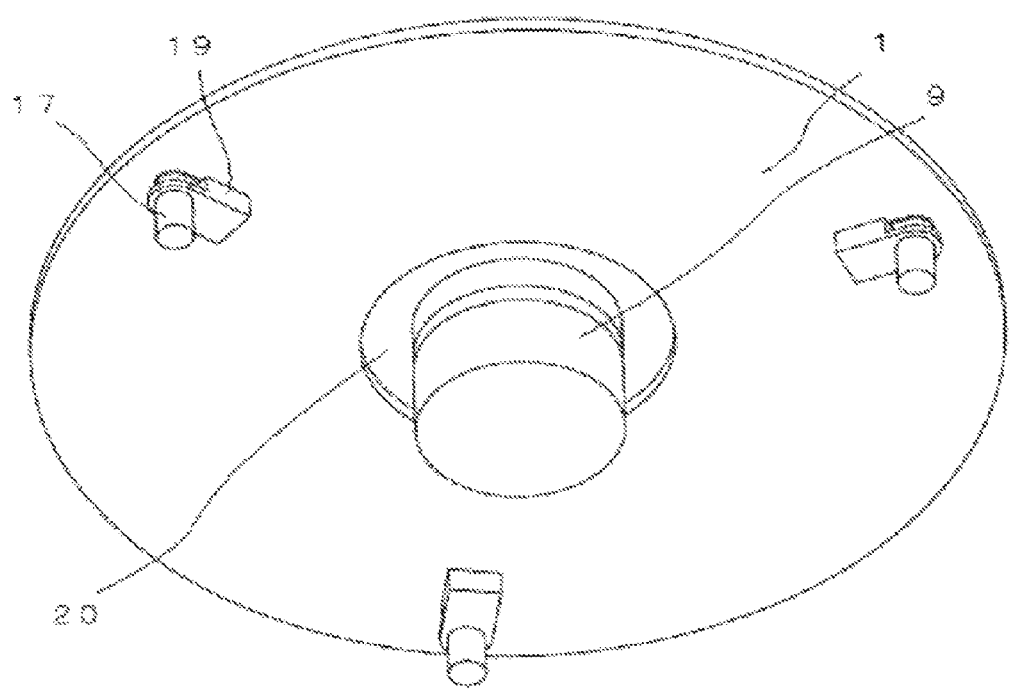
FIG. 6 is a backside perspective view of a disk stabilizing plate according to an Exemplary Embodiment 2 of the present invention.

FIGS. 5 and 6 show perspective views of a disk stabilizing plate 1 and a spindle motor 9 according to a second Exemplary embodiment. FIG. 5 is a perspective view from upside and FIG. 6 is a perspective view from underside. The same numerals as FIG. 1 indicate the same members. The disk stabilizing plate 1 is a concentric circular shape and provided with plunger holes 16 in a peripheral area at regular intervals. A diameter of the center hole of the disk stabilizing plate 1 is larger than an outer diameter of the spindle motor 9. As shown in FIG. 6, a solenoid 17 is fixed at the plunger hole 16 through an attachment 19. The disk stabilizing plate 1 is not necessarily circular-shaped in this Exemplary Embodiment because the disk stabilizing plate does not rotate.

Preferably three or more plunger holes 16, inside of which the solenoid 17 is fixed, are provided. That is because at least three supporting points are necessary to support a thin disk in planar state stably. In this Exemplary Embodiment, three holes are illustrated. The disk stabilizing plate 1 is fixed by a fixation device (not shown) onto a base (not shown). The spindle motor 9 is fixed onto the base (not shown) at the center of the disk stabilizing plate 1 by metal fittings (not shown). The air can flow through a gap 20 between the spindle motor 9 and the center hole of the disk stabilizing plate 1.

Figure 7:
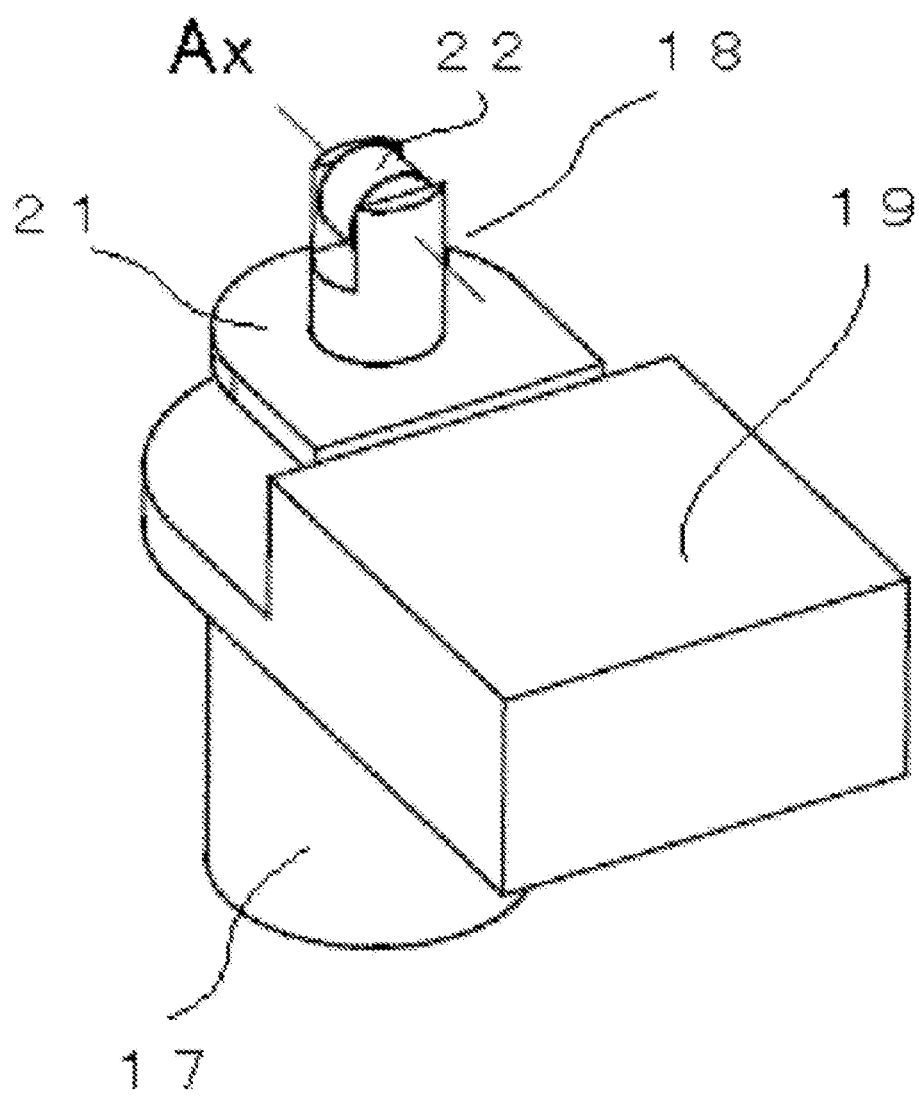
FIG. 7 is a perspective view of a solenoid and an attachment according to an Exemplary Embodiment 2 of the present invention.

FIG. 7 is a perspective view of the solenoid 17 and the attachment 19. A plunger 18 is inserted in the solenoid 17. A stopper 21 is fixed with the plunger 18 so as to prevent rotation of the plunger 18. A cylindrical roller 22, which is rotatable around a rotating axis of Ax, is provided at a head portion of the plunger 18.

Figure 8:
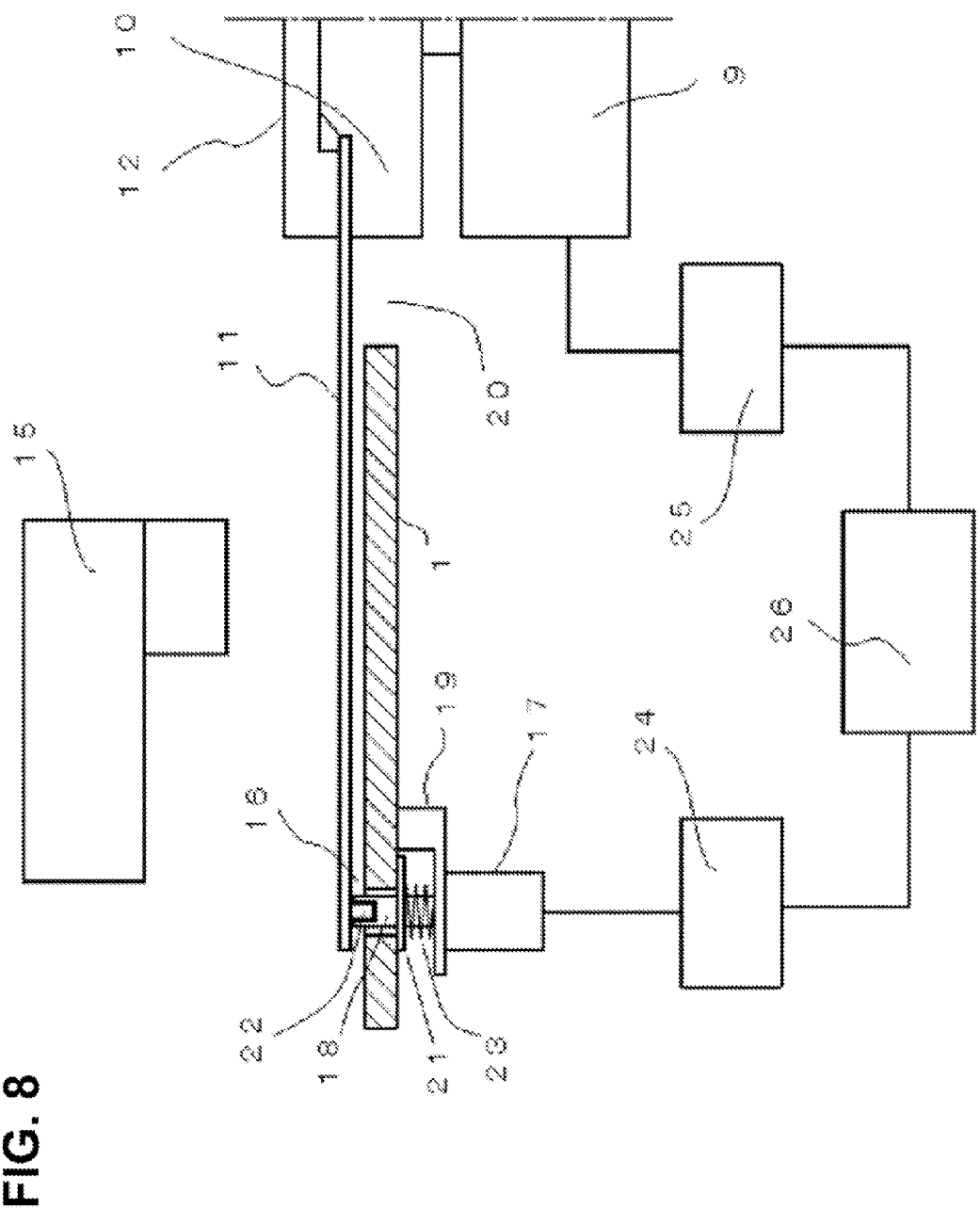
FIG. 8 is a sectional view of a thin disk according to an Exemplary Embodiment 2 of the present invention in a stationary state.

FIG. 8 shows a half of a sectional drawing, in which a thin disk 11 is put on both the roller 22 of the disk stabilizing plate 1 and the spindle motor 9, and the spindle motor 9 is stationary. The thin disk 11 is inserted in the spindle motor 9 and fixed on the spindle motor 9 by a clamper 12. A coil spring 23 for pushing the plunger 18 in an upward direction of FIG. 8 is inserted between the stopper 21 of the plunger 18 and the solenoid 17. Thus the plunger 18 is kept in a state that the stopper 21 is in contact with a backside of the disk stabilizing plate 1. The position of the stopper 21 is set such that the roller 22 protrudes toward the thin disk 11 from the plunger hole 16 in this state.

The solenoid 17 is attached to the disk stabilizing plate 1 such that the rotating axis Ax of the roller 22 is arranged in the radial direction of the thin disk 11. The thin disk 11 is in contact-supported state at the peripheral area by the roller 22 that is rotatably mounted at the head portion of the plunger 18 protruding over the surface of the disk stabilizing plate 1. Thus the thin disk 11 is not in contact with the surface of the disk stabilizing plate 1.

An optical head 15 is arranged at the opposite side of the disk stabilizing plate 1 with respect to the thin disk 11. The solenoid 17 is connected to a solenoid driving circuit 24 and the solenoid driving circuit 24 is connected to a control circuit 26. The spindle motor 9 is connected to a spindle motor driving circuit 25 and the spindle motor driving circuit 25 is connected to the control circuit 26. The control circuit 26 monitors the rotating speed of the spindle motor 9.

Figure 9:
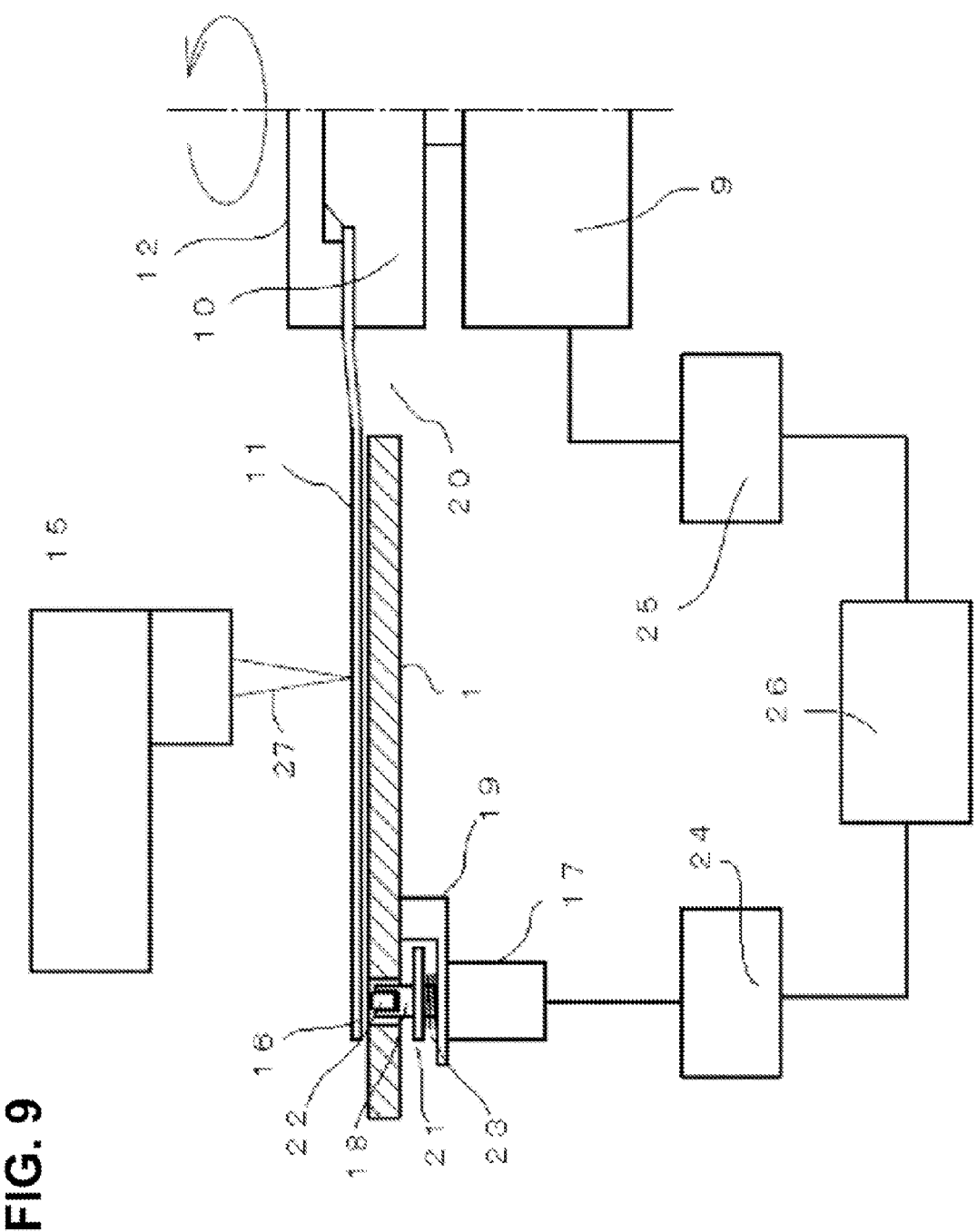
FIG. 9 is a sectional view of a thin disk according to an Exemplary Embodiment 2 of the present invention in a rotating state.

Next, an operation of Exemplary Embodiment 2 will be explained with reference to FIG. 9. When the spindle motor 9 is stationary, that is, does not rotate, the thin disk 11 is contact-supported at the peripheral area by the roller 22 as shown in FIG. 8 and not contact with the disk stabilizing plate 1. Thus the thin disk does not locally adhere to the disk stabilizing plate 1. When the spindle motor 9 starts rotating and the thin disk 11 also starts rotating as well, the roller 22 contacting with the thin disk 11 rotates, either. Thus the thin disk does not show a contact mark.

As the rotating speed is increased and reaches the predetermined value, such as 90% of the lowest speed for recording/reading, the control circuit 26 detects it and instructs the solenoid driving circuit 24 to drive the solenoid 17. The solenoid driving circuit 24 receives the instruction and drives the solenoid 17 so as to draw the plunger 18. As the solenoid draws the plunger 18, the roller 22 mounted at the head portion of the plunger 18 is drawn below the surface level of the disk stabilizing plate 1, and the contact-state with the thin disk is terminated. The draw-back of the roller 22 from the surface level of the disk stabilizing plate 1 causes loss of the supports for the thin disk 11 at the peripheral area and renders a free state with a support by the clamper 12 at the center portion. The air comes through the gap 20 as the disk stabilizing plate 1 rotates, and the incoming air flows in a space between the thin disk 11 and the disk stabilizing plate 1 toward the periphery of the thin disk. By the aerodynamic force of the air flow, the disk 11 is attracted to the disk stabilizing plate 1 and can keep a small distance from the disk stabilizing plate and rotate stably with less disk contact.

In this state, an optical beam 27 is applied on the thin disk from the optical head 15 and the recording/reading is performed. Because the roller 22 is drawn below the surface level of the disk stabilizing plate 1 during the recording/reading, the air flow is not disturbed. When the recording/reading is completed, the spindle motor 9 begins to decrease its rotating speed. As the rotating speed decreases and when the control circuit 26 detects that the rotating speed reaches the predetermined value such as 90% of the lowest speed for recording/reading, the control circuit 26 instructs the solenoid driving circuit 24 to stop driving the solenoid 17. The solenoid driving circuit 24 stops driving the solenoid 17 according to the instruction. As the driving of the solenoid 17 is ceased, the plunger 18 is lifted up by the coil spring 23 until the stopper 21 touches the backside of the disk stabilizing plate 1, and as a result, the roller 22 mounted at the head portion of the plunger 18 is protruded over the surface level of the disk stabilizing plate 1 to make contact with the thin disk 11.

When the spindle motor is stationary, the state returns to FIG. 8 and the thin disk 11 is contact-supported by the roller 22 at the peripheral area and not in contact with the disk stabilizing plate 1. Thus the thin disk 11 does not locally adhere to the disk stabilizing plate 1.

It is assumed in this Exemplary Embodiment 2 that a wavelength of the laser beam used for recording/reading is 405 nm and an NA of the objective lens for collecting the laser beam is 0.85. However, the same structure can be applied even in a case where a wavelength of the laser beam is 650 nm or less and an NA of the objective lens is 0.6 to 0.7. In such a case, the optical head 15 may be provided at the same side and under the disk stabilizing plate 1 although the optical head 15 is provided at the opposite side of the disk stabilizing plate 1 from the thin disk 11 in Exemplary Embodiment 2. In such a case, a material of the disk stabilizing plate 1 can be an optical glass through which the laser beam can penetrate, and its thickness can be 0.5 mm, for example, that can be optically modified such that the thin disk 11 can be handled with a conventional optics of an optical head.

The contact position of the thin disk 11 and the roller 22 is preferably outer area of the most peripheral area of information recording region so as to protect the information recording region of the thin disk 11. In addition, a radial position of the solenoid 17 attached on the stabilizing plate 1 is located further than the radial position of the periphery of the information recording region of the thin disk 11 because the laser beam for recording/reading is applied on the thin disk 11 through the disk stabilizing plate 1. Although a solenoid is used for driving the plunger 18 in this structure, it may be possible to use a motor and a link mechanism.

As many apparently widely different exemplary embodiments of the present invention can be made without departing from the spirit and scope thereof, it is to be understood that the invention is not limited to the specific exemplary embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned.

EXPLANATION OF SYMBOLS 1 disk stabilizing plate
2 hub
3 concave portion
4 disk supporting member
5 supporting portion
6 elastic (resilient) member
7 air hole
8 hub hole
9 spindle motor
10 turntable
11 thin disk 12 clamper
15 optical head
16 plunger hole
17 solenoid
18 plunger
19 attachment
20 gap
21 stopper
22 roller
23 coil spring
24 solenoid driving circuit
25 spindle motor driving circuit
26 control circuit
27 optical beam
G centrifugal force
Ax rotating axis

What is claimed is:

1. A disk stabilizing plate for making a thin disk rotate stably, provided underneath the thin disk and in a record/read device that handles a thin record/read disk, comprising:
a movable disk supporting member that, in connection with a predetermined rotating condition of the thin disk, supports the thin disk by protruding upwardly over a surface level of the disk stabilizing plate and contacting the thin disk, or terminates the supporting state for the thin disk by lowering below the surface level of the disk stabilizing plate.

2. The disk stabilizing plate according to claim 1, wherein;
the disk supporting member supports the thin disk by protruding upwardly over a surface level of the disk stabilizing plate and contacting the thin disk when a rotating speed of the thin disk is not larger than a predetermined value, and the disk supporting member is lowered below the surface level of the disk stabilizing plate when the rotating speed of the thin disk exceeds the predetermined value.

3. The disk stabilizing plate according to claim 2, wherein the disk stabilizing plate rotates along with the thin disk.

4. The disk stabilizing plate according to claim 3, wherein;
the disk supporting member is made of an elastic member an end of which is provided with additional mass and the other end of which is fixed to the disk stabilizing plate, and the end portion is protruding upwardly over the surface level of the disk stabilizing plate when no external force is applied, and wherein;
the disk stabilizing plate rotates along with the thin disk and when the rotating speed exceeds the predetermined value, the elastic member bends toward a radially outer direction of the thin disk by the centrifugal force of the mass provided at the end of the disk supporting member and the disk supporting member is lowered below the surface level of the disk stabilizing plate.

5. The disk stabilizing plate according to claim 2, wherein the disk stabilizing plate is disposed stationary and does not rotate.

6. The disk stabilizing plate according to claim 5, wherein the disk supporting member comprises a roller at a position contacting with the disk, and wherein;
the disk stabilizing plate comprises a disk supporting member driving portion that makes the disk supporting member, in connection with the predetermined rotating condition of the thin disk, protrude upwardly over the surface level of the disk stabilizing plate, or lower below the surface level of the disk stabilizing plate from the supporting state for the thin disk.

7. A method for preventing sticking of a thin disk to a disk stabilizing plate for making the thin disk rotate stably that is provided underneath the thin disk and in a record/read device that handles a thin record/read disk, comprising:
protruding a movable disk supporting member upwardly over a surface level of the disk stabilizing plate to support a thin disk in connection with a predetermined rotating condition of the thin disk; or
lowering the movable disk supporting member below the surface level of the disk stabilizing plate in connection with the predetermined rotating condition of the thin disk.

8. The method according to claim 7, wherein;
the disk supporting member is protruded upwardly over the surface level of the disk stabilizing plate when a rotating speed of the thin disk is not larger than a predetermined value, and wherein;
the disk supporting member is lowered below the surface level of the disk stabilizing plate when the rotating speed of the thin disk exceeds the predetermined value.

9. The method according to claim 7, wherein;
the disk supporting member is made of an elastic member an end of which is provided with additional mass and the other end of which is fixed to the disk stabilizing plate, and the disk supporting member is lowered by centrifugal force generated by rotation of the disk stabilizing plate that rotates with the thin disk.

10. The method according to claim 7, comprising:
protruding or lowering the disk supporting member, having a roller at a position contacting with the disk, by a disk supporting member driving portion in accordance with a rotating speed of the thin disk.

* * * * *